Nov. 7, 1950     L. OLBRYS     2,529,099
BALANCE WEIGHT
Filed Dec. 29, 1945
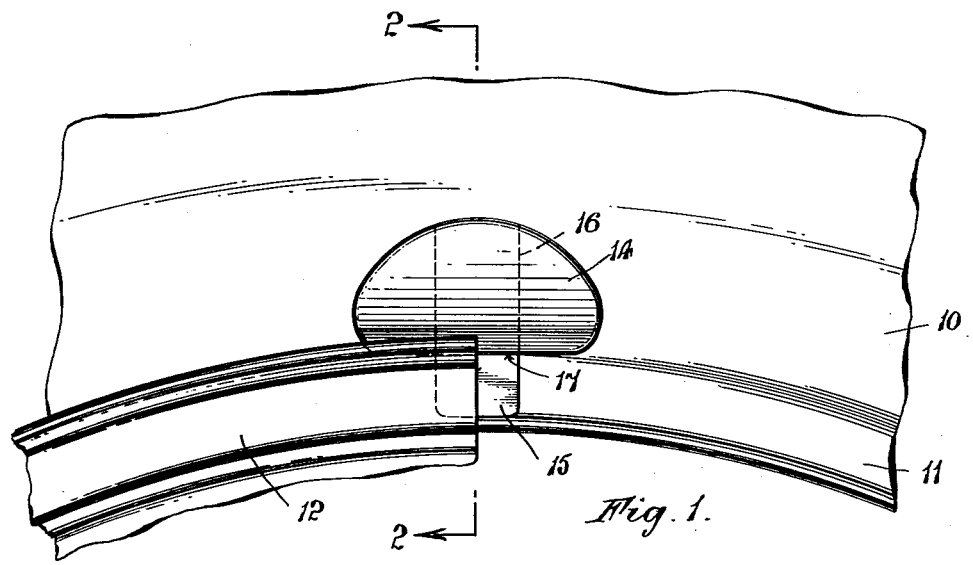
Fig. 1.
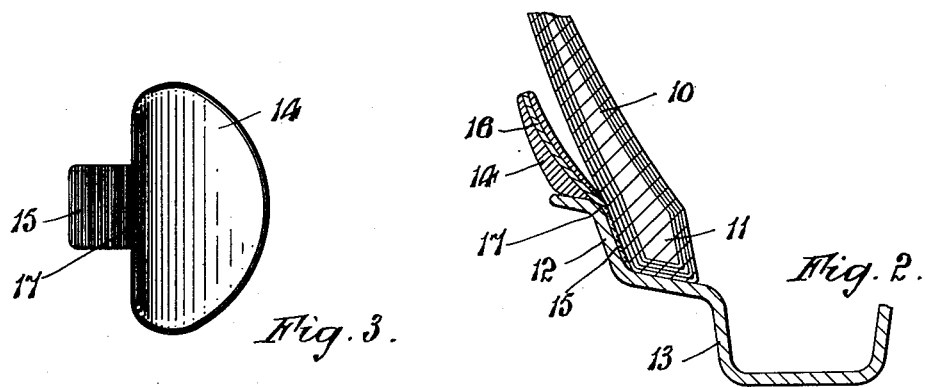
Fig. 3.     Fig. 2.
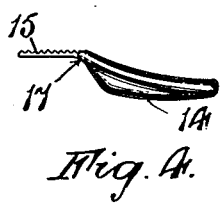     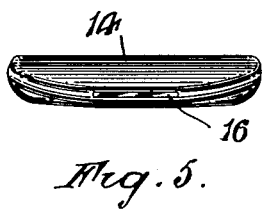
Fig. 4.     Fig. 5.
INVENTOR.
Leo. Olbrys.
BY
Stanley Lightfoot Patented Nov. 7, 1950

2,529,099

UNITED STATES PATENT OFFICE 2,529,099

BALANCE WEIGHT

Leo Olbrys, Hamtramck, Mich.

Application December 29, 1945, Serial No. 638,156

2 Claims. (Cl. 301—5)

This invention relates to weights for use in the balancing of automobile wheels in assembly with their tires and has for its object to provide such a device of simple construction which may be applied to a wheel and tire for balancing purposes quickly but effectively in such position as may be determined necessary following tests for lack of balance in such wheel and tire.

A further object is to provide for the simple attachment of such a weight by utilizing pressure between the bead or side wall of a tire casing and its enclosing tire rim, said weight device being of a form which will permit of ready application in such manner.

A further object of the said invention is to provide such a weight having a tab capable of insertion between the bead of a tire casing and its enclosing tire rim and adapted by tapping to be forced therebetween against the resistance of an inflated tire casing and to thereafter maintain itself in such applied position during subsequent use of the tire on the road.

A still further object is to provide such a weight having a tab for insertion between a tire casing and its enclosing rim and reinforcing means in said weight to receive shock incidental to tapping of weight into position and protect the weight proper against damage by such tapping.

Still further it is an object of the said invention to provide for adjustment of the weight about its attachment to the wheel and tire whereby spacing between the weight proper and the side wall of the tire may be regulated.

Still further objects or advantages incidental or subsidiary to the aforesaid objects or resulting from the construction or operation of the invention as it may be carried into effect will become apparent as the said invention is hereinafter further disclosed.

In carrying the said invention into effect I may adopt the novel construction and arrangement of parts illustrated by way of example in the accompanying drawing, wherein:

Figure 1 is a fragmentary elevation of a tire and wheel rim to which my improved weight is applied, part of the said rim being broken away to more clearly illustrate the structure.

Figure 2 is a detailed cross-section of the same taken on a plane indicated by the line 2—2 in Figure 1.

Figure 3 is a face view of the balance weight removed.

Figure 4 is a side view of the same, and;

Figure 5 is a plan view of the same.

Similar characters of reference indicate similar parts in the several figures of the drawing.

10 indicates the side wall of a tire, the bead 11 of which is fitted against the flange 12 of a wheel rim 13 and 14 is a weight of any suitable shape or mass attached to, molded on or integral with a downwardly depending tab 15. The face of this tab is preferably roughened or serrated as will be clearly seen from an examination of Figures 3 and 4.

This tab is of a depth approximating that of the said flange 12 and is intended to be forced inbetween such rim and the bead 11 of the tire casing wall as shown in Figures 1 and 2. These serrations referred to gripping the surface of the tire bead and resisting displacement of the device once it is forced into position.

As the force by which such tabbing is intended to be positioned is in the nature of tapping by means of a hammer on the upper free edge of the weight, I prefer to extend the material of the tab 15, which may be in the form of a steel strip, upwardly of the weight 14 as at 16 to or proximate to the outer free edge of the weight in order that it may receive and transmit the blows directly to the said tab 15. Such construction would be especially desirable where the weight proper 14 is made of some soft metal such as lead which might be damaged by the careless use of a hammer on part of the work.

I also prefer to make the tab 15 of material of such a degree of flexibility that it may be bent about its point of attachment 17 to the weight in order that by so bending the weight inwardly or outwardly toward or from the side wall of the tire, any desired spacing from such side wall may be effected to suit operating conditions of the time.

With a weight of this type, its ready assembly on a wheel and tire either alone or in conjunction with other similar weights may be easily effected to meet required disposition for proper balancing and it will be firmly held in its correct position through the use of the tire on the road until such time as the tire may be removed as for repairs when the weight would automatically be displaced. This is desirable because once the tire is removed from the wheel and replaced there is very little chance of the new assembly meeting the same conditions of balance which existed before it was removed so it is therefore desirable that the wheel be again tested for balance before the weight is reapplied in what would most likely be a new position in order that it may be correct.

This invention may be developed within the scope of the following claims without departing from the construction or operation of the said invention and it is desired that the specification and drawing be read as being merely illustrative of a practical embodiment of the said invention and not in a strictly limiting sense.

What I claim is:

1. In a device of the class described, a weight, a tab extending from one edge of said weight for insertion between the bead of a tire and the flange of the rim on which the tire may be mounted, and a reinforcement extending from and in alignment with said tab substantially directly through said weight to the opposite edge thereof to present its end as a protective area on the last-mentioned edge of said weight to receive hammer blows.

2. In a device of the class described, a weight, a tab extending from one edge of said weight for insertion between the bead of a tire and the rim flange on which a tire may be mounted, and a reinforcement integral and in alignment with said tab extending through said weight to the opposite edge thereof to present its end as a protective area on the last-mentioned edge of said weight to receive hammer blows.

LEO OLBRYS.

REFERENCES CITED

The following references are of record in the file of this patent:

UNITED STATES PATENTS

| Number | Name | Date |
|---|---|---|
| 2,029,561 | DuSang | Feb. 4, 1936 |
| 2,049,918 | Marsh | Aug. 4, 1936 |
| 2,070,995 | Mechling | Feb. 16, 1937 |
| 2,137,416 | Rubsam | Nov. 22, 1938 |
| 2,195,473 | Brethorst | Apr. 2, 1940 |
| 2,197,364 | Hatch | Apr. 16, 1940 |